United States Patent [19]

Krueger

[11] 4,281,786
[45] Aug. 4, 1981

[54] METHOD OF PRESSURE FUSING A NUT TO A SUPPORT SHEET AND PRODUCT THEREOF, AND MACHINERY FOR PRACTICING THE METHOD

[76] Inventor: Guenther Krueger, 16 Bristol Ct., Berkeley Heights, N.J. 07922

[21] Appl. No.: 180,666

[22] Filed: Aug. 25, 1980

[51] Int. Cl.³ .................... B23K 20/02; B23P 11/00
[52] U.S. Cl. ............................ 228/116; 228/3.1; 29/509
[58] Field of Search ............... 228/3.1, 135, 140, 115, 228/116, 265; 29/509, 520, 521

[56] References Cited

U.S. PATENT DOCUMENTS

| | | | |
|---|---|---|---|
| 2,703,998 | 3/1955 | Sowter | 228/115 |
| 2,707,821 | 5/1955 | Sowter | 228/115 |
| 2,799,188 | 7/1957 | Newcomb | 29/509 X |
| 3,234,987 | 2/1966 | Hentzi | 151/41.72 |
| 3,399,705 | 9/1966 | Breed et al. | 151/41.73 |
| 3,775,833 | 12/1973 | Grube | 228/116 |
| 3,883,915 | 5/1975 | Steward | 151/41.73 X |
| 3,909,913 | 10/1975 | Tildesley | 29/509 X |
| 3,948,142 | 4/1976 | McKay et al. | 151/41.72 X |
| 4,095,327 | 6/1978 | Hartmann | 29/509 |

Primary Examiner—Gil Weidenfeld
Assistant Examiner—K. J. Ramsey

[57] ABSTRACT

A pressing machine has opposingly spaced-apart compacting surfaces movable toward each other to weld malleable metal of a metal sheet having a nut-receiving circular aperture therethrough, into a welded state with a malleable metal of circumscribing side-walls of a cylindrically-shaped undercut nut mounted in the aperture. The nut's top has a greater diameter than the aperture. A bottom one of the compacting press surfaces has a raised rim or ridge, and an upper one of the compacting press surfaces has a plurality of raised portions, arranged in a circular array to overlap edge portions of the sheet at its aperture. With the plurality of raised portions pressing downwardly, and the ridge in a circular shape around an annulus hole of the bottom press surface, the compacting surfaces in a single compacting movement in compacting the sheet carrying the inserted nut having overlapping top edges, results in an article in which the metal sheet has become welded to the nut.

8 Claims, 6 Drawing Figures

METHOD OF PRESSURE FUSING A NUT TO A SUPPORT SHEET AND PRODUCT THEREOF, AND MACHINERY FOR PRACTICING THE METHOD

BACKGROUND TO THE INVENTION

Prior to the present invention, nuts have been mounted on metal support plates or sheets by a machine press compacting the nut into an aperture and forcing malleable metal of the sheet into a nut-circumscribing recess located beneath an upper nut edge overhanging and overlapping the adjacent sheet surface next to the aperture. Such method thus resulted in a clamped-in nut-form of bradded article which under excessive or repeated normal extraction pressures resulting from objects supported by screws mounted in the nuts, resulted too frequently in the nut being torn from its clamped-in seat within the aperture. Also, to prevent the clamped-in nut from revolving within the aperture seating structure of the sheet, the prior art companies have sometimes serrated a portion of the nut's circumscribing wall-edge so that it binds when the nut is pressed into its seated clamped-in position within the aperture. Another approach to prevent the clamped-in nut from twisting or turning in its seating aperture structure, has been to pre-form the nut to have an upper circumscribing edge of other than circular shape, such as hexagonal so that when the nut is compacted into the aperture, the hexagonally shaped nut-edge is bradded into the malleable metal of the surface of the sheet. While such nuts effectively prevent twisting or turning of the nut in its seated state, they never-the-less still have the low resistance to accidental extraction noted-above. Also of great significance, the manufacturing costs of such specially-shaped nuts is high, with a resulting high sales price for the finished product.

As is typically shown in the U.S. Pat. No. 4,095,327, the prior art presses the nut into a seated state within an aperture within the aperture-forming structure of the aperture. This patent illustrates still another approach for clamping the seated-nut into its position by bending-over upper circumscribing aperture edge structure onto the top edge of the seated nut. As shown in this patent, the top of the nut when seated often does not remain extending or protruding above the surface of the metal support plate.

On the other hand, some nuts when seated within the aperture are flush with both the upper and lower surfaces of the sheet or support plate in which the nut is seated, such as for example fasteners of the Southco Inc. company as typical of such prior art. The upper edge of some of this company's fasteners include the above-discussed hexagonal shape, while others have the generally circular shape but with serrated circumscribing portions. Likewise, the Penn Engineering and Manufacturing Corp. carries both of these types of nuts as fasteners for use in thin panels. U.S. Pat. No. 3,399,705 shows a scolloped wall and downwardly-flanged lip.

OBJECTS OF THE INVENTION

Accordingly, objects of the present invention include the overcoming or avoiding of problems, difficulties and short comings of the above-noted prior art, by obtaining a novel pressing machine, a novel method, and a novel resulting artical.

Another object is to obtain a novel pressing machine, method and resulting article of improved simplicity eliminating prior high cost nuts while concurrently achieving greater resistance to potential extraction of the nut during excessive and repeated pressures experienced in normal usage.

Another object is to obtain a pressure-fusion meld between a fastener nut and a supporting plate or sheet of metal or other malleable material, to obtain improved resistance to both turning of the nut when seated, and to extraction of the nut, whereby improved support capability exists for members in need of support.

Other objects become apparent from the preceding and following disclosure.

One or more objects of the invention are obtained by the novel pressing machine, method and articles resulting therefrom as typically represented in the accompanying Figures which are intended to improve understanding of the nature of the invention in its preferred embodiments but not to unduly limit the invention which includes obvious variations and modifications within the spirit of the invention.

BROAD DESCRIPTION

Broadly the invention may be described as a novel pressing machine, the method of use with particular nuts and sheets or supporting plates, and the resulting pressure-fused artical of which the sheet's malleable material is welded to the nut's circumscribing wall structure. The pressure fusion is achieved by virtue of opposing spaced-apart pressing surfaces, one or more thereof and preferably both, having a raised portion in typically the shape of a cylinder column and/or a semi-circle in cross-section which preferably is a circular ridge. The raised portion(s) is or are positioned such that contact thereof will be made with a surface of a plate aligned between the spaced-apart pressing surfaces, with the contact being in juxtaposition to an aperture having a nut inserted thereinto. Also, the contact is preferably with a portion of a circumscribing upper surface portion of the nut positioned to overhang and overlap a portion of the sheet next to the aperture, whereby concurrently compacting forces and pressure cause malleable material, preferably metal, to be pressed-downwardly into a receded portion of the nut's circumscribing outer-wall. In a further preferred embodiment in which there is at least one raised portion on one of the pressing surfaces, and in opposing relationship thereto there is another raised surface on the oppositely spaced-apart pressing surface, whereby the malleable metal of the sheet in juxtaposition to the aperture is compacted with excessively high magnitude of forces and pressures causing the crowded malleable material to press fusingly into the circumscribing outer-wall of the nut, even to the extent of bulging within each of the sheet surface and the nut's outer circumscribing wall at their point(s) of juncture.

In a further preferred embodiment, one of the raised portions is an annular ridge of semi-circular cross-section, positioned such that it is aligned with surface edge portions circumscribing the aperture, where the surface edge portions are sheet edges to the aperture, which presses a slot into the sheet.

As in the prior art, the nut has a female-threaded aperture or hole extending axially thereof.

In a further preferred embodiment, the receded portion of the nut's outer circumscribing wall is a recess preferably extending circumscribingly around the nut's circumscribing outerwall.

In a further preferred embodiment, there are a plurality of raised portions, preferably as columnar shaped structures, extending from a first pressing surface positioned to impact upon the top edge of the nut as that edge overhangs and overlaps the sheet surface, in order that pressure fusion may be achieved at multiple locations, preferably equally spaced-apart. It is also contemplated that both upper surface raised portion and lower surface raised portion, of the spaced-apart pressing surfaces, may each being continuous in the nature of a continuous or broken ring-like ridge.

Obviously, as in conventional prior art, the pressing machine includes drive mechanism and structure for moving the pressing surfaces toward one-another and thereafter retracting the pressing surfaces from each other after the nut has been pressure-fused to the apertured support plate or sheet.

The invention may be better understood by making reference to the following Figures.

THE FIGURES

DETAILED DESCRIPTION

Figure 1:
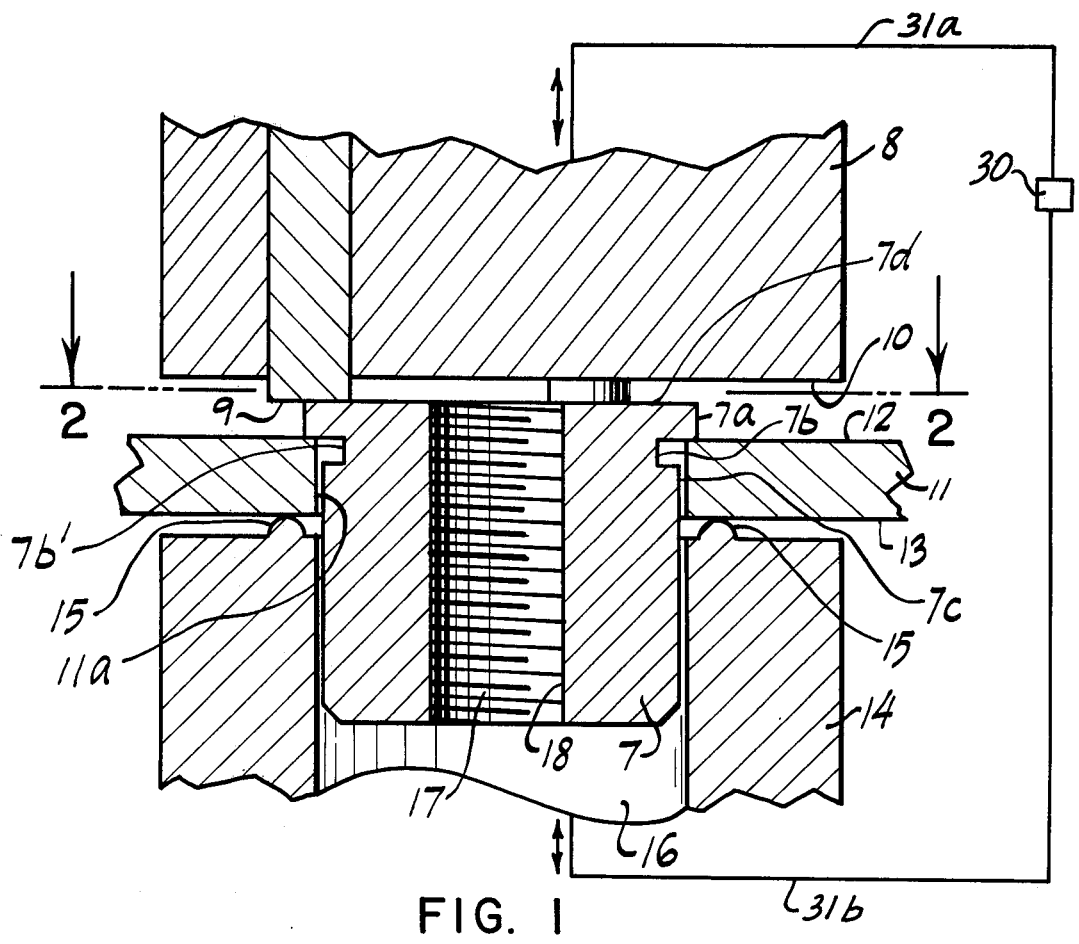
FIG. 1 illustrates diagrammatically a side view in cross-section and in in-part view, of a lower press-support and an upper press, with an apertured support sheet having a nut mounted in the aperture ready for pressing pressures to be applied.
Figure 2:
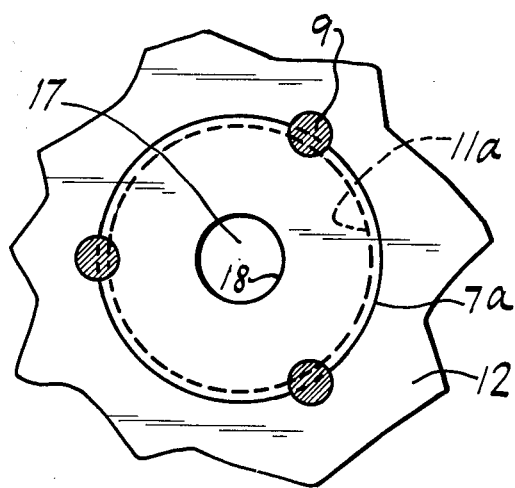
FIG. 2 illustrates an in-part view as taken along line 2—2 of FIG. 1.
Figure 3:
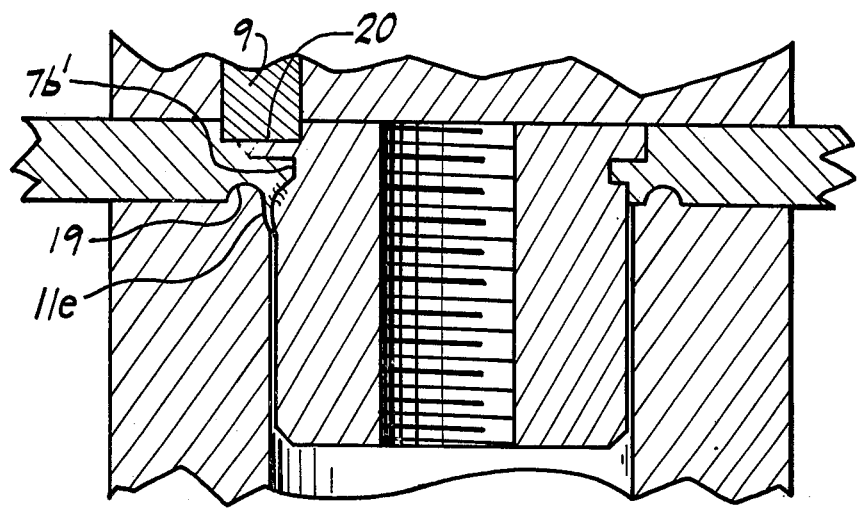
FIG. 3 illustrates further the representation of FIG. 1, but after pressing forces have been applied, illustrating the resulting pressure fusion whereby the nut is welded to the support sheet.

FIGS. 1 through 3 typically illustrate the method and the pressing machine of the present invention, in so far as novel aspects thereof are involved.

FIGS. 3 through 6 typically illustrate the resulting novel pressure-fused welded artical and the use thereof.

Figures 4, 5:
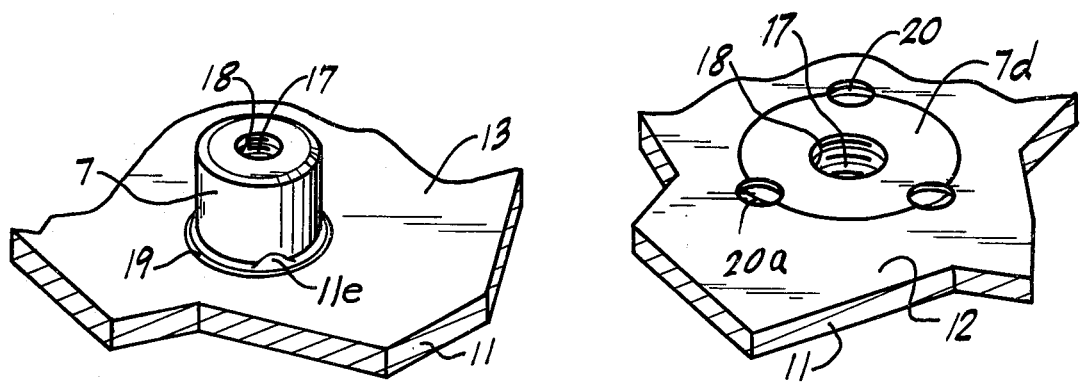
FIG. 4 illustrates a bottom view in perspective of the nut welded to the plate as represented above in FIG. 3.
FIG. 5 illustrates a top perspective view of the plate (support sheet) as the nut is welded thereto, as represented in FIGS. 3 and 4.
Figure 6:
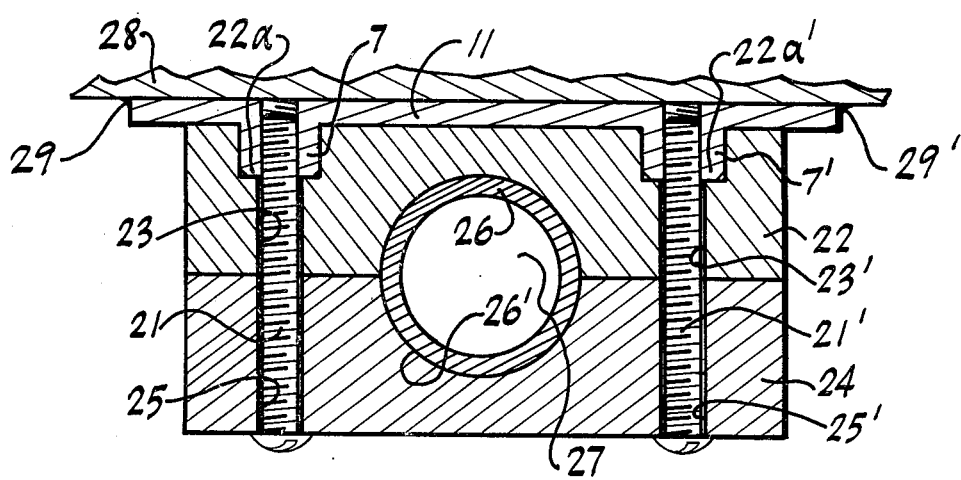
FIG. 6 illustrates diagrammatically a side view in cross-section in in-part view, of a support sheet(plate) having two nuts mounted (welded) thereto, with a pipe support mounted onto the nuts and with the pipe support supporting a pipe, thus illustrating a typical use of the sheet-mounted nuts of this invention.

More particularly, FIGS. 1 through 3 illustrate a common embodiment, as well as the FIGS. 4 through 6 still also representing a common embodiment in so far as the same original elements being involved to the extent illustrated in earlier Figures Thus, indicia once explained will not be repeated for each Figure.

FIG. 1 shows a nut 7 mounted within an aperture 11a of a supporting sheet or plate 11 beneath a press 8 having press nipples or tits 9 and with the nut 7 mounted above the press 14 having annular ridge 15. Thus, the nipples 9 are the raised portions on and relative to the upper press 8, and the annular ridge 15 is a continuous raised portion on the lower press 14. There are shown a plurality of the nipples 9, and it is within the contemplated scope of the invention to utilize one or more of separate spaced-apart raised portions other than a continuous ridge, on the lower press 14. Preferably there are utilized a plurality of the nipples 9, which also may be joined as a continuous annular raised portion (downwardly-directed). While it is within the scope of the invention to utilize alone either the nipples 9 or the lower presses raised portion(s) such as the annular ridge 15, preferred pressure fusion evenly distributed around the circumscribing wall of the nut is achieved by having the upper press's raised portions evenly-spaced around as is typically shown in FIGS. 1 and 2, and likewise to have the lower press's raised portions equally spaced around as is the case in the continuous annular ridge 15. Also, the greater degree and strength of pressure fusion is achieved as preferred when both the upper and lower raised portions are used, as illustrated in FIGS. 1 and 3, for the machine, the method of use and the product-artical formed by the pressure-fusion welding of the nut and the supporting sheet 11.

The nut 7 is mounted with the overhanging lip 7a, within the aperture 11a, and has a recessed portion 7b (and 7b') as a continuous (preferred) annular recess along the circumscribing wall of the nut 7, with the lower wall 7c having the diameter of the nut at that point larger than the diameter at the recess and smaller than the diameter at the overhanging lip 7a. The overhanging lip 7a has a nut diameter greater than the diameter of the aperture 11a.

The upper press has its lower pressing surface 10 beyond which extend the nipples 9 such that during pressing the nipples make contact with the nut's upper surface 7d before eventual contact by the surface 10 after the nipples 9 have been pressed into the surface 12 of the sheet 11.

The lower press 14 has a space 16 which is of spaceous dimensions allowing the nut 7 to be seated therein, during the pressing operation.

The nut 7, as with conventional nuts, has female threaded wall 18 forming through-space 17.

As is graphically represented, the upper press 8 and the lower press 14 are movable to and fro (upwardly and downwardly) toward and away from one another, or at least one thereof movable toward and away from alternately the other one, so as to press the nut 7 into its fused-position and state as illustrated in FIG. 3. The FIG. 1 thus merely graphically represents the conventional and prior-art elements 31a and 31b and the motor mechanism 30 operatively connected to support and move the presses 8 and 14 as above described.

FIG. 2 illustrates a preferred positioning of the nipple(s) 9 in a position partially overlapping the outer nut edge 7a such that when pressed downwardly forcefully in contact, a portion of the nipple 9 will eventually come into contact with the sheet surface 12, with the result that at that moment it will be pressing the nipple(s) into and below surface 12 thus concurrently compressing sheet matter and the matter of the lip 7a which as shown in FIG. 3 becomes also compressed into the sheet 11 thereby large quantities of the metal of the sheet being malleably pressed into the recess 7b (and 7b') and downwardly toward the sheet surfaces 11a and 13 and downwardly toward the circumscribing wall 13 of the nut; concurrently the annular ridge 15 is pressing into the surface 13 to also compress malleable metal of the sheet 11 toward the surfaces 12, and 13 of the sheet and surface 7c of the nut. The result of this compression concurrently by each of the nipple(s) 9 and the annular ridge 15 is to bring about a fusion as illustrated in FIG. 3 with a typically protruding (extruded, in effect) portion 11e located at a position aligned with the position of the nipple(s) 9. The fusion (pressure fusion) is a metal weld by which the nut is mechanically fused and locked to the sheet 11. The protruding portion 11e may be seen as illustrated in each of FIGS. 3 and 4.

In FIG. 4 there is illustrated the annular groove 19 which is formed by the forceful movement of the annular ridge 15 against the sheet's surface 13, as also shown in FIG. 3.

In FIG. 5, there is shown the punched recesses formed and also shown in the FIG. 3 illustration, as a result of the press's nipples 9.

While the pressure fusion is typically illustrated in the FIG. 3, there may often be additional areas of pressure fusion other than merely diagrammatically represented. The point is that definite welding and fusion of metals does take place such that there is no longer a two-piece situation, but a unitary single fusion-joined piece in which the nut is integral with the metal of the sheet. Efforts to wring the nut from its welded state and plate or sheet by an article screw-mounted therein resulted in merely wringing-off the screw or bolt, in an actual trial. The welded nut would not turn nor twist in its seat, and could not be pulled from its seat. Such is not the case with the prior art mounted nuts, which prior art nut also—as previously noted, require scolloping or serrating of the nut circumscribing wall, or employing irregularly shaped nuts such as hexagonal, to prevent the turning of the nut in its prior art seated state. And prior art mounted nuts can be pulled from their seats under the same circumstances withstood by the present invention.

In FIG. 6, there are diagrammatically represented two spaced-apart nuts mounted by the present invention on the support sheet 11. The support sheet is typically conventionally arc welded at weld points 29 and 29' to a supporting member 28. The nuts 7 and 7' are seated within sockets 22a and 22a' of pipe-mounting member 22. The mounting members 22 and 24 have bolt-mounting channels 23 and 25 and 23' and 25', mounting bolts 21 and 21' which have male threads screw-mounted into the female threads of the nuts 7 and 7'. Typically and conventionally a pipe 26 has its through-space 27, and is supported on its exterior surface 26' by the supporting members 22 and 24.

The method is thus illustrated typically in FIGS. 1 and 3, and in FIG. 2, showing the relative positioning of the presses and nipple(s) and annular ring, respectively, relative to the inserted nut prior to pressing in FIGS. 1 and 2, and after the pressing step in FIG. 3, with views of the completed product in FIGS. 4 and 5 and use of the product in FIG. 6. Either of the opposing pressing presses may be moved toward the other, or both moved toward each other, with the sheet-seated nut aligned therebetween such that the seated nut becomes pressure-fused in its seat, with the top surface 7d of the nut thereafter being pressed substantially flush with the sheet surface 12, and with the indentations 20 and annular groove 19, and the protruding portion 11e, which protruding portion normally results from the excessive compacting forces pressure fusing the nut to the sheet.

The sheet is illustrated as metal, as is the nut. However, it is within the scope of the invention to utilize any of various plastics as the sheet and the nut so long as they are mutually malleable sufficiently to weld when subjected to appropriate pressure by the novel press(es) of this invention as set-forth above. Conventional dimensions may be utilized for nuts, sheet, etc.

It is within the scope of the invention to make variations and substitution of equivalents within ordinary skill of the art.

I claim:

1. A method of securing a nut to a support plate comprising in combination: (1) inserting a cylindrically-shaped nut into through-space of an aperture of a sheet of malleable material, said sheet having opposite first and second surfaces and said aperture including said through-space extending through said sheet and said first and second surfaces, said aperture being substantially circular, and said nut being undercut, the nut having top and bottom ends with a circumscribing outer-wall surface extending between said top and bottom ends, said aperture having a first predetermined diameter at said first surface, and said nut having a second predetermined maximum diameter at a point in juxtaposition to said top end and the nut having a female-threaded channel extending between said top and bottom ends, said second predetermined maximum diameter being of a greater dimension than said first predetermined diameter of said aperture, and said nut at the undercut thereof having a third predetermined diameter of said circumscribing outer-wall surface at a smaller diameter than each of said first and second diameters, (2) substantially aligning first and second press-surfaces at each of opposite ends of said aperture, at least one of said first and second press-surfaces being movable toward the other of the first and second press-surfaces sufficiently to compact said top end and said sheet therebetween, the first press-surface including a first raised portion positioned above and to concurrently press upon each of (a) a portion of said first surface in juxtaposition to said aperture and (b) an edge-portion of said top end of the nut, said edge-portion overhanging said first surface when the nut is in the inserted state, the second press-surface mounting a second raised portion positioned to come into contact with and become pressed into a portion of said second surface at a location spaced-away from and in juxtaposition to said aperture, and (3) pressing at least one of said first and second press-surface toward the other one thereof a distance sufficiently to compact said edge-portion into said first surface and sufficiently to compact said sheet adjacent said second surface against said circumscribing outer-wall with sufficient force to weld the sheet to the circumscribing wall of the nut.

2. A method of claim 1, in which said second raised portion comprises an annular raised ridge positioned on said second press-surface at a location substantially circumscribing the aperture, and in which said pressing includes impressing the annular raised ridge against the second surface of the sheet, thereby impressing an annular slot into the second surface of the sheet at a point spaced-away from and in juxtaposition to the aperture such that said malleable material becomes welded to said circumscribing outer-wall surface of the nut.

3. A method of claim 2, in which said pressing includes pressing plurality of said first raised portions into contact with each of said first surface and said edge-portion of the nut, such that said malleable material becomes welded to said outer-wall surface at a recess location of said undercut at spaced-apart points corresponding to locations of each of said plurality.

4. A method of claim 1, in which said pressing includes pressing a plurality of said first raised portions into contact with each of said first surface and said edge-portion of the nut, such that said malleable material becomes welded to said outer-wall surface at a recess location of said undercut at spaced-apart point corresponding to locations of each of said plurality.

5. A method of claim 1, in which said pressing includes said malleable material being metal and said nut being also metal, and the metal of the malleable material welding with the metal of the nut.

6. A machine for pressure fusing a nut to a support sheet, comprising in combination: (1) a first press-surface having a plurality of spaced-apart separate raised portions extending outwardly substantially parallel to one-another from the first press-surface and with the plurality being arranged in substantially a circle having a diameter of a predetermined dimension such that each of the raised portions overlap an edge of an aperture of predetermined size in a sheet to be compacted by said first press-surface and by said plurality; and a second annularly-shaped press-surfce positioned in spaced-apart and opposing relationship to the first press-surface, the second annularly-shaped press-surface having a second raised portion extending from the second annularly-shaped press-surface toward said first press-surface, with the second raised portion being positioned in spaced-away relationship and in juxtaposition to a hole of the annulus of said second annularly-shaped press-surface, and the hole of the annulus being of a predetermined diameter.

7. A machine of claim 6, in which said second raised portion is in the form of a ridge substantially circumscribing the hole of the annulus.

8. A method of claim 1, in which said pressing includes compacting said first press-surface against said top end sufficiently that the top end is pressed-downwardly at-least even with said first surface of said sheet.

* * * * *